United States Patent
Ferré-Rangel et al.

(10) Patent No.: US 9,487,153 B2
(45) Date of Patent: *Nov. 8, 2016

(54) EQUIPMENT SUPPORT SYSTEM FOR VESSELS

(71) Applicants: Antonio Luis Ferré-Rangel, San Juan, PR (US); William Couvertier-Vazquez, Fajardo, PR (US)

(72) Inventors: Antonio Luis Ferré-Rangel, San Juan, PR (US); William Couvertier-Vazquez, Fajardo, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,984

(22) Filed: Oct. 27, 2014

(65) Prior Publication Data

US 2016/0114734 A1    Apr. 28, 2016

Related U.S. Application Data

(63) Continuation-in-part of application No. 13/552,841, filed on Jul. 19, 2012, now Pat. No. 8,869,998.

(51) Int. Cl.
*A47F 7/00*    (2006.01)
*B60R 9/08*    (2006.01)
*F16M 13/02*    (2006.01)

(52) U.S. Cl.
CPC ............. *B60R 9/08* (2013.01); *F16M 13/022* (2013.01)

(58) Field of Classification Search
CPC .... B65B 35/55; A47B 81/00; A47B 81/005; A47F 7/0035; A63C 11/028; B63B 35/55
See application file for complete search history.

(56) References Cited

U.S. PATENT DOCUMENTS

| | | | | |
|---|---|---|---|---|
| 2,302,300 A * | 11/1942 | Davies | ........................ | B60R 9/02 116/DIG. 24 |
| 3,659,761 A * | 5/1972 | Wesson | ........................ | B62J 7/02 224/425 |
| 4,007,864 A * | 2/1977 | Hreha | ........................ | B60R 9/02 211/113 |
| 4,582,015 A * | 4/1986 | Hunter | ........................... | 114/343 |
| 4,607,773 A * | 8/1986 | Mason | ........................ | B60R 9/02 224/546 |
| 4,942,989 A * | 7/1990 | Miller | ........................ | B60R 9/02 224/322 |
| 4,944,434 A * | 7/1990 | Hamilton | ................... | B60R 9/02 224/482 |
| D317,742 S * | 6/1991 | Miller | ........................... | 224/482 |
| 5,069,474 A * | 12/1991 | Tai | .................................. | 280/658 |
| 5,078,279 A * | 1/1992 | Hancock et al. | ............... | 211/64 |
| 5,477,968 A * | 12/1995 | Largent et al. | ............... | 211/60.1 |
| 5,495,970 A * | 3/1996 | Pedrini | ...................... | B60R 9/06 211/17 |
| 5,661,942 A * | 9/1997 | Palmer | ........................ | 52/653.2 |
| 5,964,439 A * | 10/1999 | Johnson | ................... | A61G 5/10 248/278.1 |
| 6,086,284 A * | 7/2000 | Callahan | ........................ | 403/93 |
| 6,170,910 B1 * | 1/2001 | Bapst | ........................ | 297/184.13 |
| 6,375,141 B1 * | 4/2002 | Kettlestrings | ................. | 248/303 |
| 6,422,443 B1 * | 7/2002 | Erickson | ................... | B60R 9/06 224/492 |
| 6,805,513 B2 * | 10/2004 | Marquina | ...................... | 403/107 |
| 7,017,940 B2 * | 3/2006 | Hatfull | ........................ | 280/652 |
| 7,201,282 B1 * | 4/2007 | Alderman | ..................... | 211/60.1 |
| 7,249,679 B2 * | 7/2007 | Klein | .............................. | 211/37 |

(Continued)

*Primary Examiner* — Joshua Rodden
*Assistant Examiner* — Kimberley S Wright
(74) *Attorney, Agent, or Firm* — Eugenio J. Torres-Oyola; Victor M. Rodriguez-Reyes; Ferraiuoli LLC (57) ABSTRACT

An exemplary equipment support system includes a pair of U-shaped tubular arms spaced apart from one another and in a generally equivalent horizontal position. The apparatus comprises an elongated part with an adjustable mechanism configured to fit inside a fishing rod holder. At least two lateral supports opposing parallel members with an adjustable mechanism and extendable middle sections are combined to support the sporting equipment thereon.

7 Claims, 13 Drawing Sheets

(56) References Cited

U.S. PATENT DOCUMENTS

| | | | | |
|---|---|---|---|---|
| 7,284,671 | B1* | 10/2007 | Doscher | 211/59.1 |
| 7,370,599 | B1* | 5/2008 | Berman et al. | 114/364 |
| 8,028,878 | B1* | 10/2011 | Pedrini | B60R 9/06 |
| | | | | 224/495 |
| 8,465,031 | B2* | 6/2013 | Coghill, Jr. | 280/79.3 |
| 8,573,456 | B2* | 11/2013 | Farber | 224/504 |
| 8,869,998 | B2* | 10/2014 | Ferre Rangel | B63B 35/7946 |
| | | | | 211/106.01 |
| 9,045,090 | B2* | 6/2015 | Wilhelm | |
| 2004/0159759 | A1* | 8/2004 | Schultz | B63B 35/7946 |
| | | | | 248/316.2 |
| 2006/0243687 | A1* | 11/2006 | Hilger et al. | 211/70.6 |
| 2007/0057000 | A1* | 3/2007 | Webster | 224/521 |
| 2007/0062992 | A1* | 3/2007 | Hepworth et al. | 224/406 |
| 2007/0235400 | A1* | 10/2007 | Wald | 211/85.7 |
| 2007/0251904 | A1* | 11/2007 | Winig et al. | 211/106.01 |
| 2009/0188876 | A1* | 7/2009 | Erwin | 211/60.1 |
| 2010/0096347 | A1* | 4/2010 | Theobald et al. | 211/85.7 |
| 2015/0034578 | A1* | 2/2015 | Wilhelm | 211/85.7 |
| 2015/0101525 | A1* | 4/2015 | Curts et al. | 114/343 |

* cited by examiner

EQUIPMENT SUPPORT SYSTEM FOR VESSELS

STATEMENT REGARDING FEDERALLY SPONSORED RESEARCH AND DEVELOPMENT

N/A

RELATED APPLICATIONS

N/A

BACKGROUND OF THE DISCLOSURE

1. Field of the Disclosure

This disclosure relates generally to a support system and more particularly to an adjustable device or rack-mountable system for boat rods holders which holds and support sporting equipment, such as surfboard, paddleboards and articles associated therewith.

2. Discussion of the Background

Vessels are used as transportation devices to provide passage across the water. Different types and shapes of vessels are well known. On small vessels the space to carry several articles is limited, therefore carrying big objects, such as sporting equipment, is hazardous. Some vessels are equipped with fishing rod holders' holes which are known in the art for holding fishing rods. Despite the availability and use of these fishing rod holders' holes to insert fishing rods, there remains a need for providing space to carry sporting equipment which can be mounted on or removed from the vessel in a simple and easy manner.

Therefore, there is a need to provide an apparatus and method for supporting equipment on a vessel, such as surfboard, paddleboards and articles associated therewith which overcomes the disadvantages and shortcomings of the prior art.

SUMMARY OF THE DISCLOSURE

The present disclosure overcomes the limitations of the previous vessels in order to provide more space to carry several objects, more particularly sporting equipment and, accordingly with principles of the present disclosure, an apparatus easy to install and remove comprising a pair of U-shaped tubular arms spaced apart from one another and in a generally equivalent horizontal position.

The first exemplary embodiment in accordance with the principles of the present disclosure discloses each tubular arm comprising an elongated part, a middle section, a first lateral support and a second lateral support. The first lateral support comprises a first distal end and first proximal end. The second lateral support comprises a second distal end and second proximal end. The middle section comprises a middle elongated body connected to said first distal end and said second distal end on opposite sides. Further, the elongated part is angularly attached to said first proximal end.

It is another object of the present disclosure to provide an elongated part configured to fit inside a fishing rod holder.

In accordance with the principles of the present disclosure, the tubular arm comprises an elongated part that is attached to the first proximal end and configured to be inserted inside a hollow fishing rod holder's hole.

The diameter of the elongated part is smaller than the diameter of the holder. The elongated part slides in for attachment and is easily pulled out for removing it.

Another object of the present disclosure is to provide attaching means extended from the first lateral support and the second lateral support and configured to assist the support of the sporting equipment.

In accordance with the principles of the present disclosure, the tubular arm comprises the first lateral support and the second lateral support separated by the middle section, wherein said first lateral support and the second lateral support rests on top of the middle section while the first lateral support and the second lateral support contain the side to side displacement of the sport equipment.

Another object of the present disclosure is to provide an elongated part with at least a recess to be aligned with a holder's recess which assists in combination with a pass-through rod, the process of fixing the tubular arm in the fishing rod holder's hole.

Yet another object of the present disclosure is to provide an expandable middle section which expands the distance between the first lateral support and the second lateral support in order to provide more space for the sporting equipment.

The disclosure itself, both as to its configuration and its mode of operation will be best understood, and additional objects and advantages thereof will become apparent, by the following detailed description of a preferred embodiment, taken in conjunction with the accompanying drawings.

The Applicant hereby asserts, that the disclosure of the present application may include more than one disclosure, and, in the event that there is more than one disclosure, that these disclosures may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute a part of the specification and illustrate the preferred embodiment of the disclosure.

DESCRIPTION OF THE PREFERRED EMBODIMENT

Figure 1:
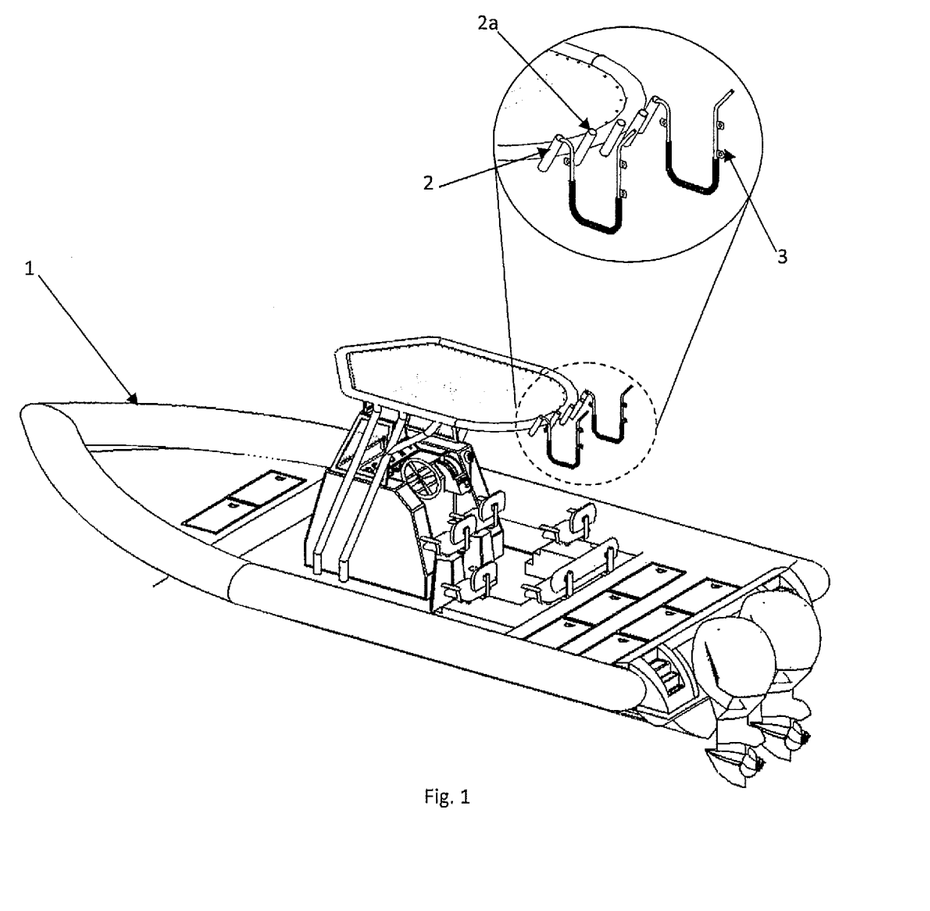
FIG. 1 shows a first general structure of the present disclosure in accordance with the principles of the present disclosure.

Referring to FIG. 1, it shows a first exemplary general structure embodiment in accordance with the principles of the present disclosure. A vessel 1 comprising a fishing rod holder 2 having a holder's hole 2a serving as an entrance for the holder hollow body for receiving the tubular arm 3. At least a pair of tubular arms is used, wherein said pair of U-shaped tubular arms 3 are spaced apart from one another in a generally equivalent horizontal position. The distance between tubular arms 3 depends on the distance between the fishing rod holders 2.

Figure 2:
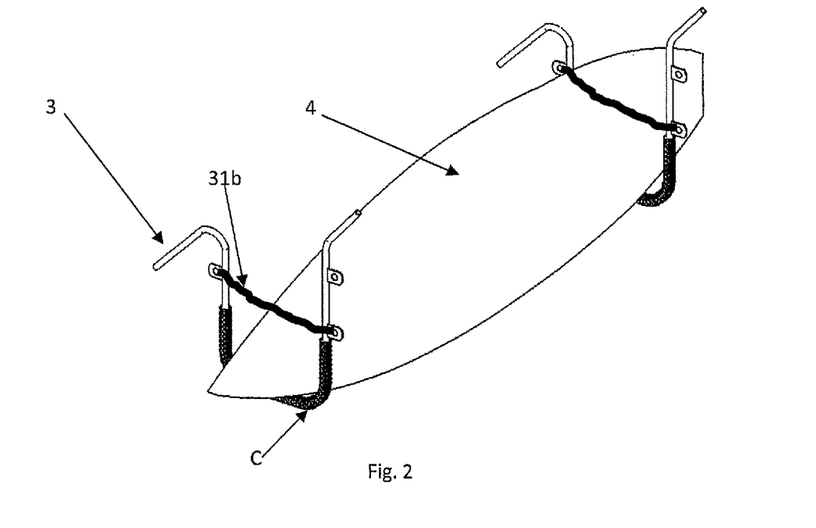
FIG. 2 shows the general structure of the present disclosure supporting sporting equipment in accordance with the principles of the present disclosure.

FIG. 2 discloses the sporting equipment 4, such as a surfing board, positioned between the tubular arms 3. The tubular arm's 3 cover C is made of plastic, rubber or any elastic material capable of avoiding damage to the sport equipment 4 while it is supported by the tubular arm 3. As shown, the tubular arm 3 surrounds most of the sporting equipment 4 and the portion not covered by the tubular arm serves as the entrance to place the sport equipment 4 between the tubular arm 3 structure. A cable 31b is used to limit the displacement of the sporting equipment 4 while it is placed on tubular arm 3 structure.

Figure 3A:
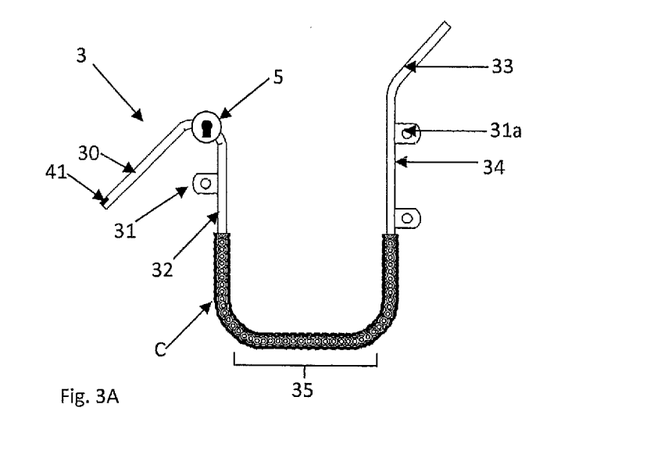
FIG. 3A-3C shows detailed views of the tubular arm structure of the first exemplary embodiment in accordance with the principles of the present disclosure.
Figure 3B:
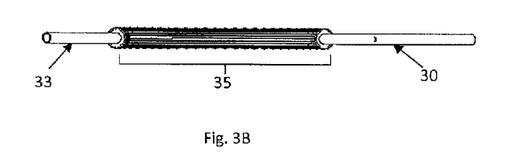
Figure 3C:
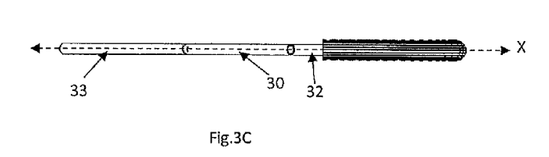

The tubular arm 3, as shown in FIGS. 3A-3C, comprises an elongated part 30, a middle section 35, a first lateral support 32 and a second lateral support 34. The first lateral support comprises a first distal end 32a and first proximal end 32b shown in more details below. The second lateral support comprises a second distal end 34a and second proximal end 34b shown in more details below. The middle section 35 comprises a middle elongated body connected said first distal end 32a and said second distal end 34b. In the present first embodiment the first distal end 32a, the second distal end 34b and the middle section 35 are mechanically coupled. The mechanical coupling can be accomplished by making, connecting or bonding the parts together. For example, the parts are mechanically coupled if the parts are integrally made or connected by other means such as screws, bonding compounds and others. In the first exemplary embodiment, the first distal end 32a, the second distal end 34b and the middle section 35 are made integrally. Further, the elongated section 30 is angular or inclined with respect to said first proximal end 32b. It is understood that the purpose of the elongated part 30 is to fix the tubular arm 3 in the holder's hole 2a.

The inclination or angle desired depends on the fishing holder holes. Basically, the elongated part 30 having a recess 41 serves as a hook for the tubular arm 3. The elongated part 30 serving as a hook is configured to fit inside the holder's hole 2a. As an alternative, the elongated part 30 can be adjusted by adding adjustable means 5 between the elongated part 30 and the first proximal end 32b. For example, an adjustable means 5, as disclosed below, provides a preferred angle for the elongated part 30. The adjustable means 5, 500 avoids unwanted movement of the elongated part 30 in a particular direction and can be re-adjusted for user convenience. Further, the first lateral support 32 and the second lateral support 34 comprise protrusions 31. The protrusions serve to avoid unwanted displacement of the sporting equipment 4. The protrusion 31 comprises protrusion holes 31a wherein an elastic cable 31b can pass through or is held in position by using the protrusion's holes 31a.

Further, as shown in FIG. 3B, the middle section 35 separates the first lateral support 32 and second lateral support 34. Further, FIG. 3C is a side view of the tubular arm 3, which shows the second support comprising an extension member 33 extending from the second proximal end 34b and away or different direction from the elongated part 30. The extension member 33 assists with the process of sliding the sporting equipment 4 inside the tubular arm 3. In addition, the inclination of the elongated part 30 and/or the extension member 33 are parallel to the same axis of the first lateral support 32 and second lateral support 34.

Figure 4A:
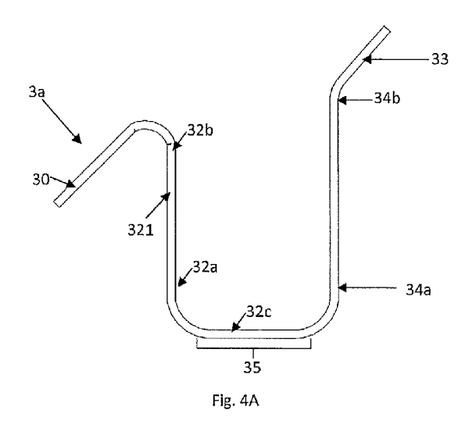
FIG. 4A-4C shows a second exemplary embodiment of the tubular arm embodiment in accordance with the principles of the present disclosure.
Figure 4B:
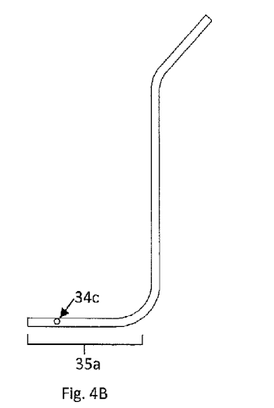
Figure 4C:
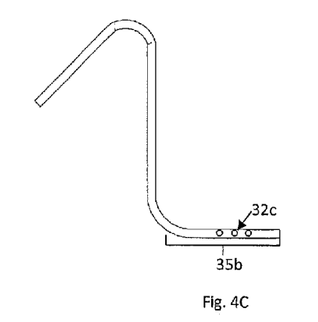

FIG. 4A through FIG. 4C shows the second exemplary embodiment in accordance with the principles of the present disclosure. As mentioned before the tubular arm 3a comprises an elongated part 30, a middle section 35, a first lateral support 32 and a second lateral support 34. FIG. 4A clearly shows the first distal end 32a, first proximal end 32b, the second distal end 34a and second proximal end 34b. The main difference between the first exemplary embodiment and the second exemplary embodiment is that the middle section 35 is adjustable. The middle section 35 comprises a first middle section 35b connected to the first distal end 32a and a second middle section 35a connected to the second distal end 34a. The second middle section 35a comprises a diameter smaller than the first middle section 35b; therefore, the second middle section 35a can be slide inside first middle section 35b. Further, in order to fix or avoid unwanted displacement between the middle section 35b and said second middle section 35a, the first middle section 35b comprises recesses 32c that in combination with a piston mechanism 34c holds the two pieces together. The piston 34c is pressed and then released inside the recess 32c selected by user. Basically, once a particular length is decided, the middle section 35 is adjusted by selecting the recess 32c that in combination with the placement of the piston mechanism 34c inside the recess 32c meets the requirements of the desired length. The number of recesses 32c may vary and depends on the manufacturer's construction or specifications. Further, it is important to understand that the farther the second lateral support 34 is from the first lateral support, the less weight the tubular arm 3 can withstand.

FIG. 5A through FIG. 6B are directed to the third exemplary embodiment in accordance with the principles of the present disclosure. As mentioned before the tubular arm 3c comprises elongated part 30, a middle section 35, a first lateral support 32 and a second lateral support 34. The main difference between the other exemplary embodiments and the third exemplary embodiment is that the elongated part 30 comprises attaching means.

Figure 5A:
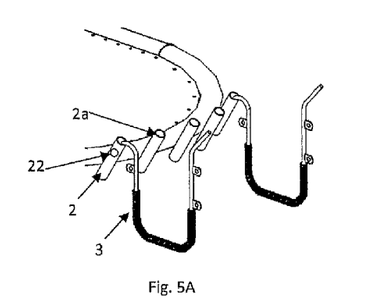
FIG. 5A-5D shows details of the fishing rod holder in accordance with the principles of the present disclosure.
Figure 5B:
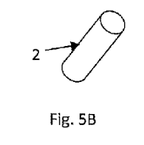
Figure 5C:
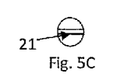
Figure 5D:
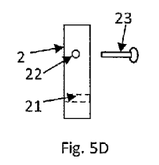

As shown in FIG. 5A through 5D the fishing holder rod comprises a hollow cylindrical configuration or holder recess 2a. The fishing holder 2, as shown in FIG. 5B through FIG. 5D, comprises a cylindrical configuration with a rod 21 extended across the inner walls of the main body and at least two holes 22 opposing each other.

Figure 6A:
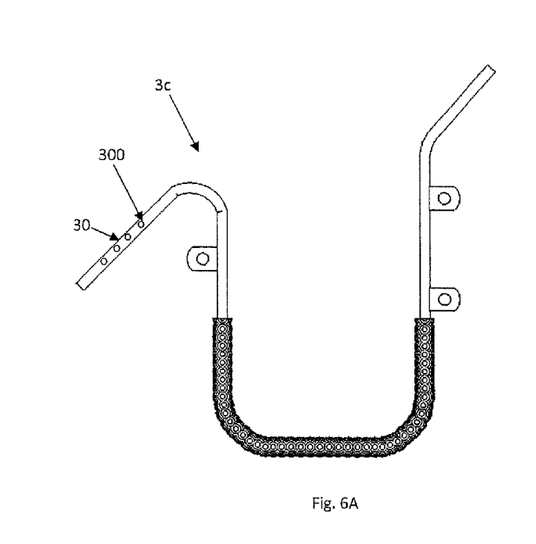
FIG. 6A-6B shows more details of the third exemplary embodiment of the tubular arm embodiment in accordance with the principles of the present disclosure.
Figure 6B:
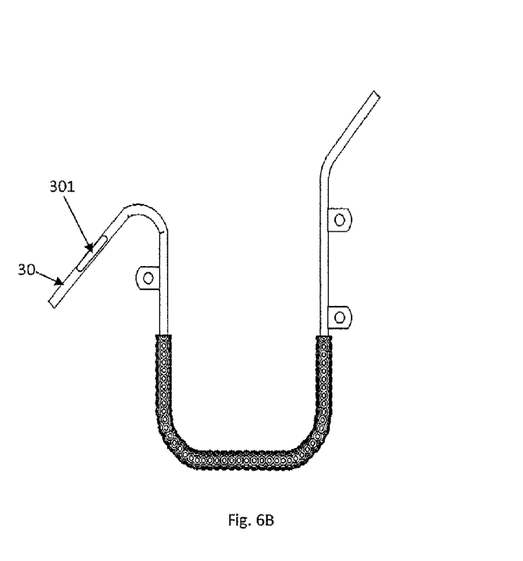

While the elongated part 30 is positioned inside the fishing holder 2, the rod 21 is configured to fit inside the recess 41 in order to avoid unwanted rotational movement of the tubular arm 3. Also, a pin 23, disclosed in more details below, passes through the holes 22 and through the elongated part 30 to fix the tubular arm 3 inside the hollow cylindrical configuration 20. The elongated part 30, as mentioned, also comprises recesses 300. During the installation process of the tubular arm 3c, the elongated part 30 with at least a recess 300 is aligned with the holder's recess 20 which assists, in combination with a pass-through rod 21 and pin 23, the process of fixing the tubular arm 3c in the fishing rod holder's hole 2a. The elongated part 30, as mentioned, comprises at least a recess 300, 301 as shown in FIG. 6A and FIG. 6B. The dimension of the recess 300, 301 depends on the manufacturer or user specifications. The material selected for the construction of the tubular arm 3 may vary. However, the selection of a strong material which is not easy to bend and can withstand different environments is preferable. For example, the use of strong plastic or metals can be used.

FIG. 7A through 18B are directed to a fourth exemplary embodiment with adjustable mean or adjustable mechanism 500. The adjustable mechanism 500, as show in FIGS. 8A and 8B, comprises an adjustable arm receiver 501 and an elongated section 50. The elongated section 50 comprises an adjustable arm supporter 502, adjustable arm extension 503 and adjustable arm fixer 504. The elongated section 50 is coupled to the adjustable arm receiver 501 in an angular or inclined manner with respect to said first lateral support 320. It has to be understood that the purpose of the elongated section 50, remains the same as explained above, wherein said elongated section 50 fixes the tubular arm 3 in the holder's hole 2a.

Figure 7A:
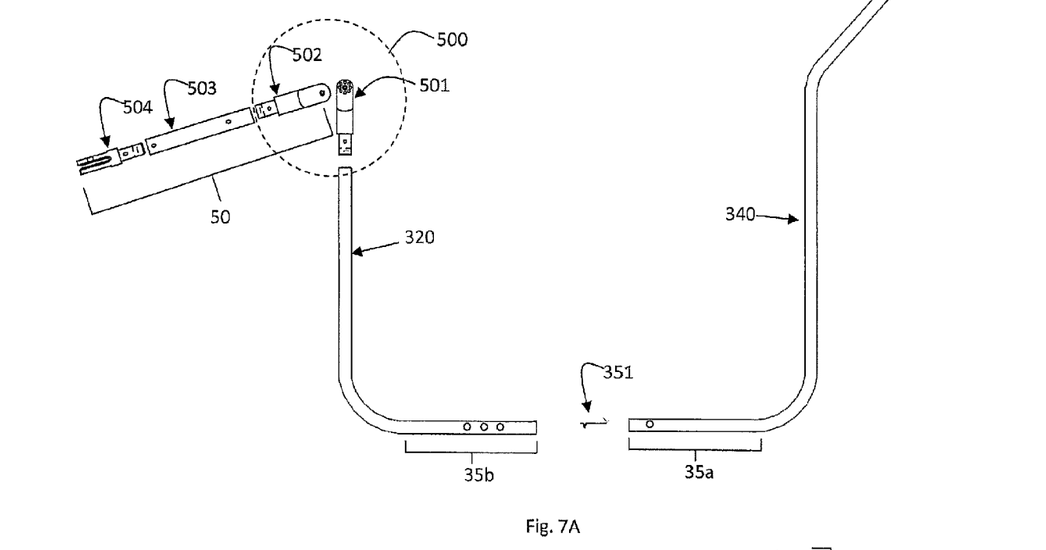
FIG. 7A-7B show general views of the tubular arm structure of the fourth exemplary embodiment in accordance with the principles of the present disclosure.
Figure 7B:
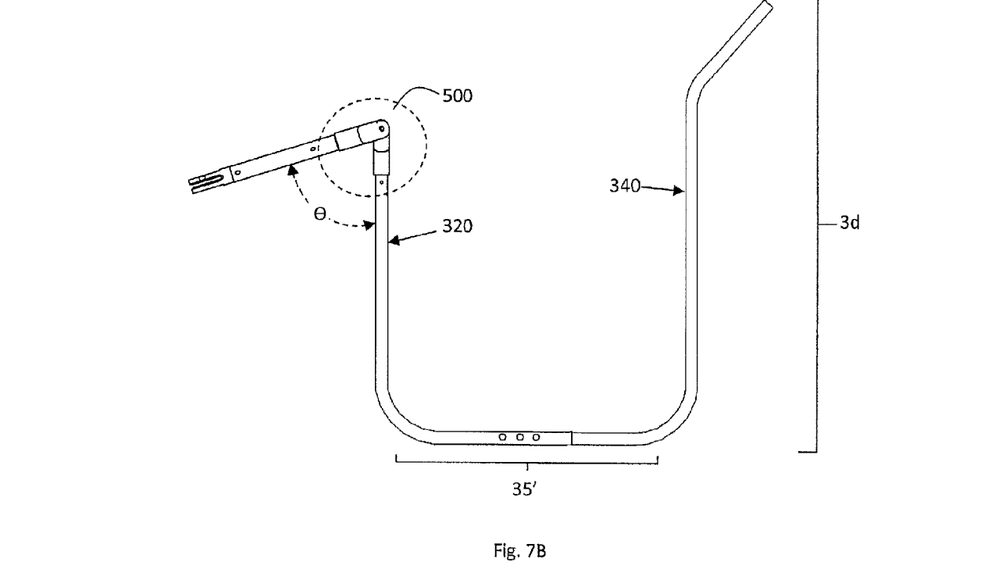

The inclination or angle desired depends on the arrangement between said adjustable arm receiver 501 and said adjustable arm supporter 502. Basically, the elongated section 50, as shown in FIG. 7B, is coupled to the adjustable arm receiver 501 for fixing said elongated section 50 at a desired angle. The elongated section 50 serving as a hook is configured to fit inside the holder's hole 2a. The adjustable mechanism 500 avoids unwanted movement of the elongated section 50 in a particular direction and can be re-adjusted for user convenience.

Figure 8A:
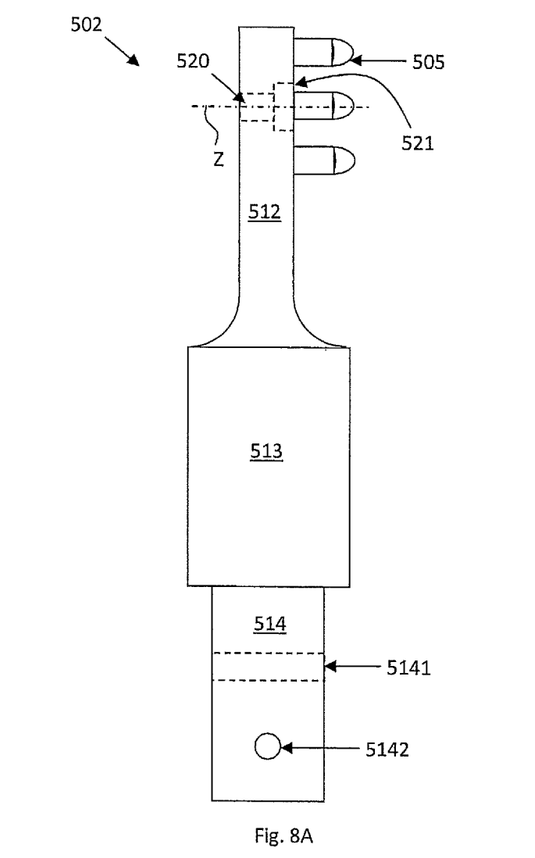
FIG. 8A-8B shows detailed views of the adjustable arm structure of the fourth exemplary embodiment in accordance with the principles of the present disclosure.
Figure 8B:
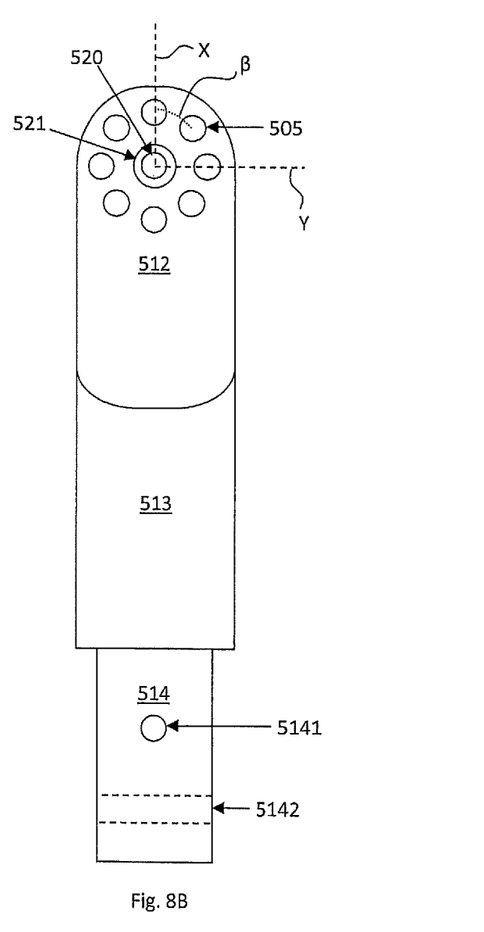

The elongated section 50, as mentioned above, comprises an adjustable arm supporter 502, adjustable arm extension 503 and adjustable arm fixer 504. FIG. 8A through 8B is directed to the adjustable arm supporter 502. The adjustable arm supporter 502 comprises an upper body 512, middle body 513 and lower body 514. The upper body 512 comprises a plurality protrusion 505 and an upper recess, wherein said upper recess comprises a first diameter 521 and second diameter 520. The protrusions 505 surround the first diameter 521 and second diameter 520. The instant exemplary embodiment, as shown in FIG. 8B, discloses a circular arrangement for the protrusions 505. However, it is important to understand that the arrangement of protrusion 505 may vary but it will surround a pivot point Z mainly defined by the second diameter 520. Further, as define in FIG. 8B, a first axis X and a second axis Y are provided to demonstrate the proportional angular displacement β between the protrusions. Therefore it is understood that angular displacement β varies with the number of protrusions surrounding the pivot point Z.

The middle body 513 is configured to provide a diameter bigger than the adjustable arm extension 503, wherein the lower body 514 is inserted. The lower body 514 comprises a diameter smaller than the middle body 513 and smaller than the first lateral support 320 wherein said lower body 514 is inserted.

Figure 9A:
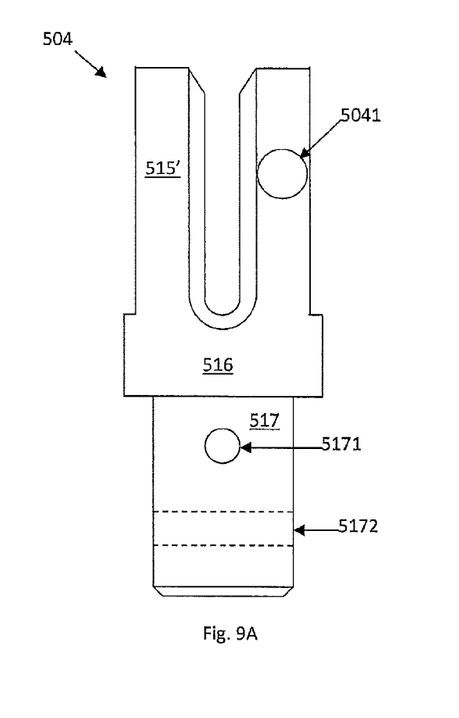
FIG. 9A-9C shows detailed views of the adjustable arm fixer structure of the fourth exemplary embodiment in accordance with the principles of the present disclosure.
Figure 9B:
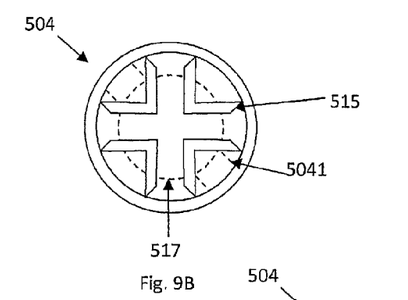
Figure 9C:
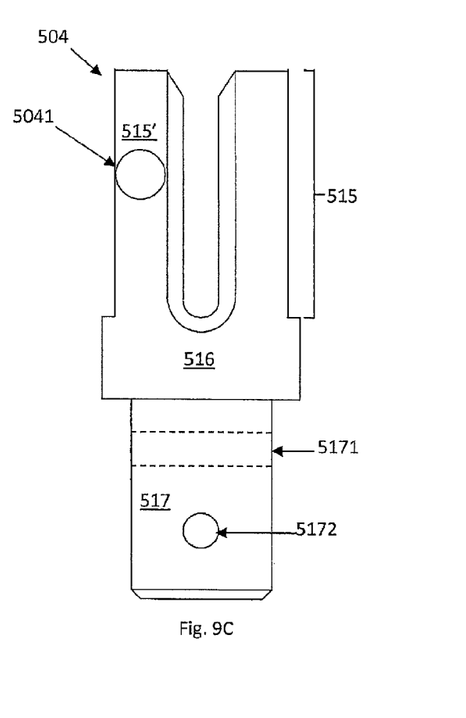
Figure 16:
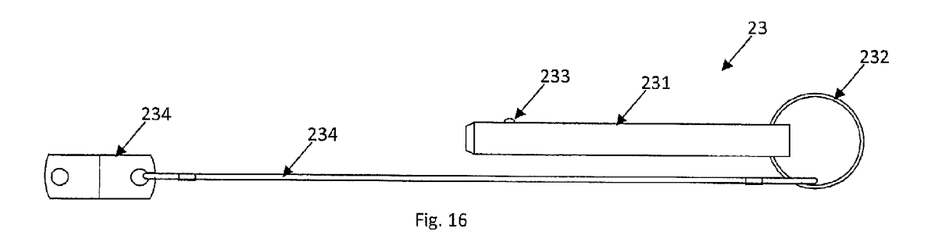
FIG. 16 shows detailed views of the pin exemplary embodiment in accordance with the principles of the present disclosure.

The adjustable arm fixer 504, as shown in FIG. 9A through 9C, comprises an upper section 515, middle section 516 and lower section 517. The upper section 515 comprises resilient members 515' extended perpendicularly to the middle section 516. At least two of the resilient members 515' comprise a pass-through hole 5041. The resilient members 515' are configured to resemble a circular shape; however the resilient members 515' might resemble a different shape. In the instant case the resilient members 515' resembles a circular configuration because it is preferred to be shaped as the same shape of the fishing rod holder's hole 2a. The purpose of the resilient members 515' is to assist the insertion of the resilient members 515' inside fishing rod holder's hole 2a by deforming inwardly in response to the compression force exerted by the fishing rod holder's hole 2a inner surface. The middle section 516 comprises a diameter bigger than the adjustable arm extension 503 and the lower section 517 comprises a diameter smaller than the middle section 516 and smaller than the adjustable arm extension 503 wherein said lower section 517 is inserted. Further, the pass-through hole 5041 is aligned with the holder's recess 22 which assists, in combination with the pin 23, as shown in FIG. 16, for the process of fixing the tubular arm 3d in the fishing rod holder's hole 2a.

Figure 10A:
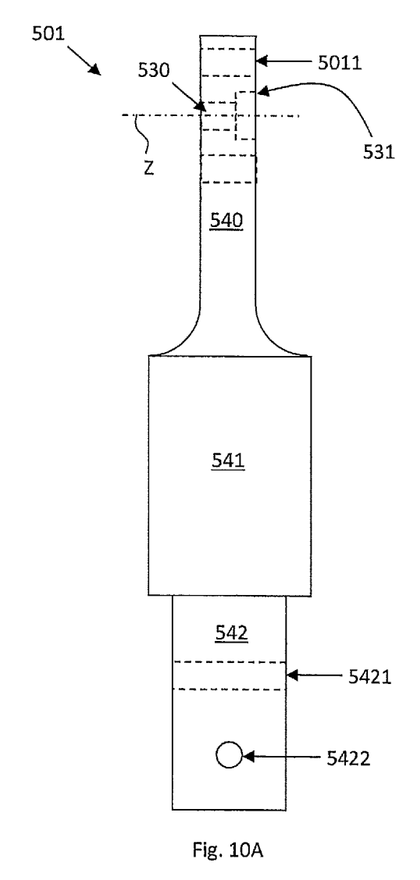
FIG. 10A-10B shows detailed views of the adjustable arm receiver of the fourth exemplary embodiment in accordance with the principles of the present disclosure.
Figure 10B:
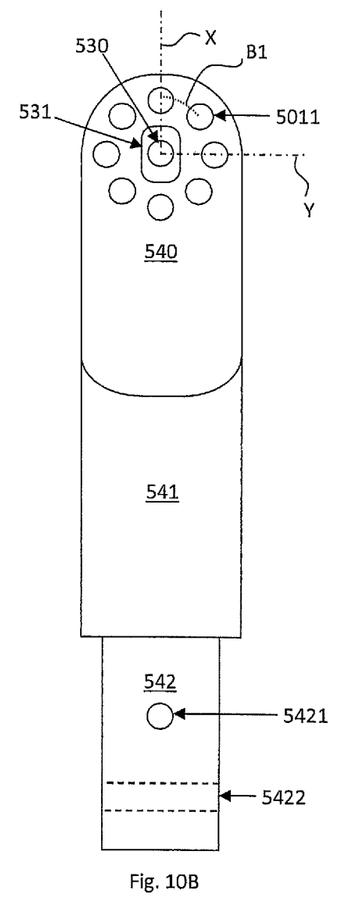

FIG. 10A through 10B is directed to the adjustable arm receiver 501. The adjustable arm receiver 501 comprises an upper part 540, middle part 541 and lower part 542. The upper part 540 comprises receiving holes 5011 and an upper receiving recess, wherein said upper receiving recess comprises a first receiving diameter 530 and second receiving diameter 531. The receiving holes 5011 surround the first receiving diameter 530 and second receiving diameter 530. The instant exemplary embodiment, as shown in FIG. 10B, discloses a circular arrangement for the receiving holes 5011. It is important to understand that the arrangement of receiving holes 5011 may vary, but it will surround a pivot point Z mainly defined by the first receiving diameter 530. Further, as define in FIG. 8B, a first axis X and a second axis Y are provided to demonstrate the receiving holes 5011 angular displacement β1 between the receiving holes 5011. Therefore, it is understood that the angular displacement β1 varies with the number of receiving holes surrounding the pivot point Z.

The middle part 541 is configured to provide a diameter bigger than the first lateral support 320, wherein the lower part 542 is inserted. The lower part 542 comprises a diameter smaller than the middle part 541 and smaller than the first lateral support 320 wherein said lower part 542 is inserted.

Figure 11A:
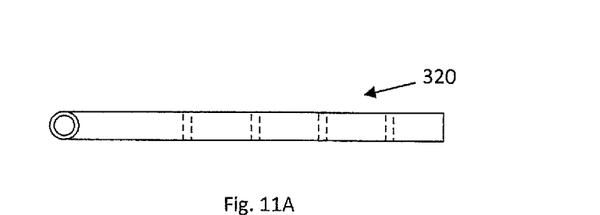
FIG. 11A-11B shows detailed views of the first lateral support of the fourth exemplary embodiment in accordance with the principles of the present disclosure.
Figure 11B:
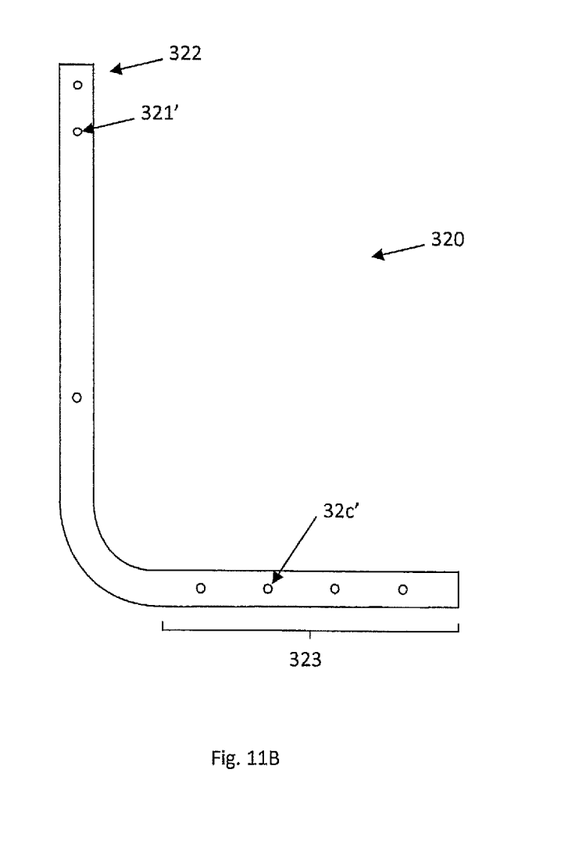
Figure 12A:
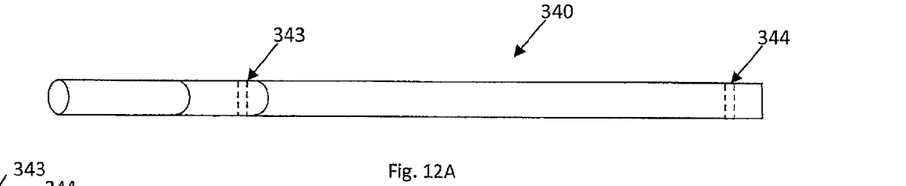
FIG. 12A-12B shows detailed views of the second lateral support of the fourth exemplary embodiment in accordance with the principles of the present disclosure.
Figure 12B:
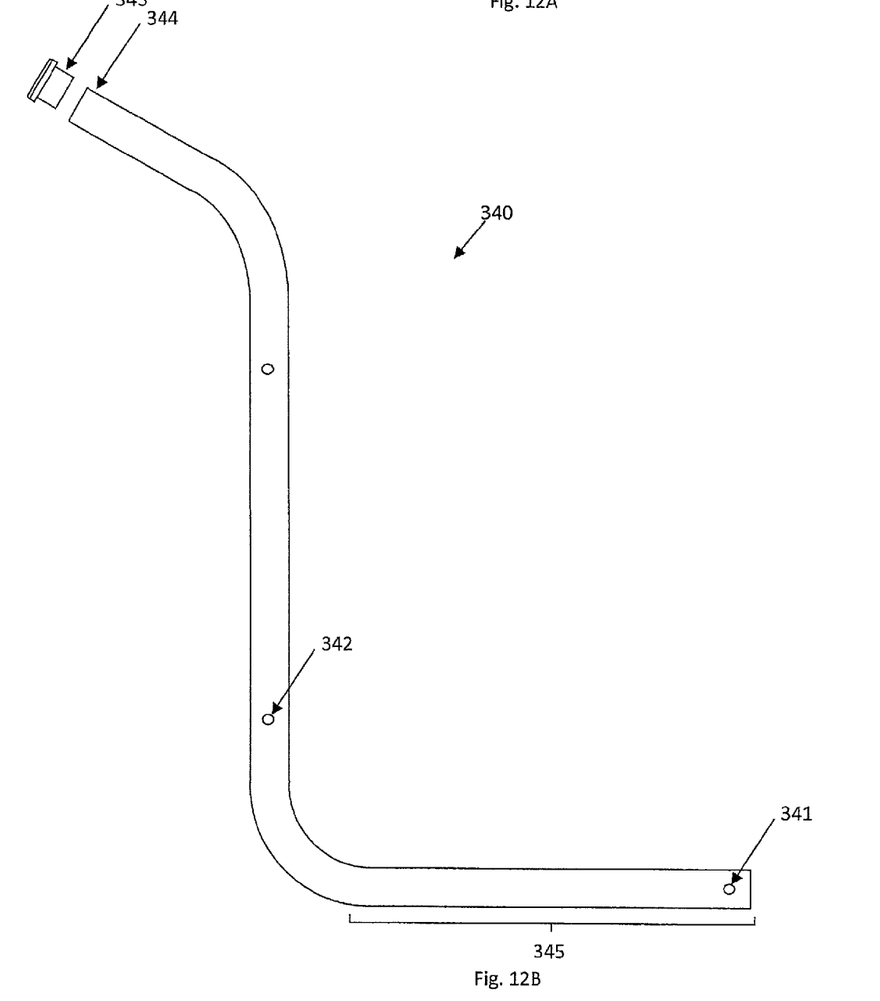

FIG. 11A through FIG. 11B, shows the fourth exemplary embodiment in accordance with the principles of the present disclosure, wherein the tubular arm 3d middle section 35' is adjustable, similar to FIG. 4A through 4C. As mentioned before the tubular arm 3d comprises an elongated part 50, adjustable mechanism 500, a first lateral support 320 and a second lateral support 340. FIGS. 11A and 11B, directed to the first lateral support 320, clearly shows the first distal end 322 comprising recess 321', wherein said adjustable arm receiver 501 is inserted, and a first middle section 323 comprising recesses 32c. FIGS. 12A and 12B, directed to the second lateral support 340, clearly shows the second distal end 344 with a cap 343 and a second middle section 323 comprising recesses 32c.

The second middle section 345 comprises a diameter smaller than the first middle section 323, therefore the second middle section 345 can be slide inside first middle section 323. Further, in order to fix or avoid unwanted displacement between the first middle section 323 and said second middle section 345, the first middle section 323 comprises recesses 32c that in combination with a piston mechanism 34c holds the two pieces together.

Figure 13:
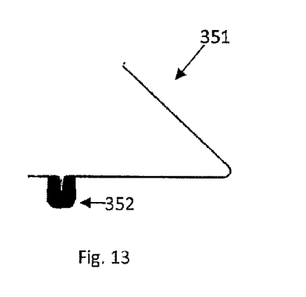
FIG. 13 shows detailed views of the piston member for the piston mechanism exemplary embodiment in accordance with the principles of the present disclosure.

The piston mechanism 34c comprises piston member 351, as shown in FIG. 13, wherein said piston member 351 comprises a resilient material, such as flat spring, with a protrusion 352. The piston member 351 is compressed and inserted inside the second middle section 345 until the protrusion 351 reaches the hole 341. While the second middle section 345 slides inside the first middle section 323, the piston member 351 is pressed and then released inside the recess 32c' selected by user. Basically, once a particular length is decided, the middle section 35 is adjusted by selecting the recess 32c' that in combination with the placement of the piston member 351 inside the recess 32c' meets the requirements of the desired length. The number of recesses 32c' may vary and depends on the manufacturer's construction or specifications. Further, it is important to understand that the farther the second lateral support 340 is from the first lateral support the less weight the tubular arm 3d can withstand.

Figure 14:
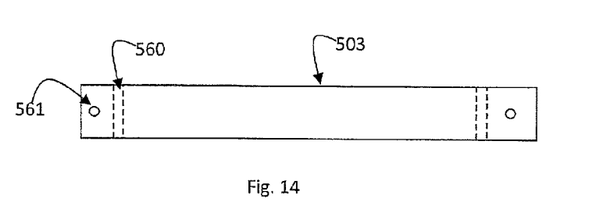
FIG. 14 shows detailed views of the adjustable arm extension of the fourth exemplary embodiment in accordance with the principles of the present disclosure.
Figure 15:
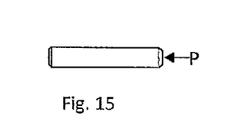
FIG. 15 shows detailed view of the adjuster exemplary embodiment in accordance with the principles of the present disclosure.

FIG. 14 is directed to the adjustable arm extension 503, wherein said adjustable arm extension 503 comprises an elongated hollow cylindrical body. The adjustable arm extension 503 further comprises a several pass-through holes 560, 561, wherein said pass-through holes assist to adjust the adjustable arm extension 503 to the adjustable arm fixer 504 lower section 517 at a first end; and wherein said pass-through holes assists to adjust the adjustable arm extension 503 to the adjustable arm supporter 502 lower body 514 at a second end. The lower body 514 recesses 5141, 5142 are aligned with at least one of the pass-through holes 560, 561, at the first end of the adjustable arm extension 503; and the lower section 517 recesses 5171, 5172 are aligned with at least one of the pass-through holes 560, 561, at the second end of the adjustable arm extension 503. Once the pass-through holes 560, 561 are aligned, a bolt P, as shown in FIG. 15, is used to fix the different parts.

FIG. 16 is directed to the pin 23, wherein said pin 23 comprises an third elongated body 231, a second piston mechanism 233, a ring 232 adjusted to the third elongated body 231, a cord 234 and a tag 235 fixed to said cord 234.

Figure 17:
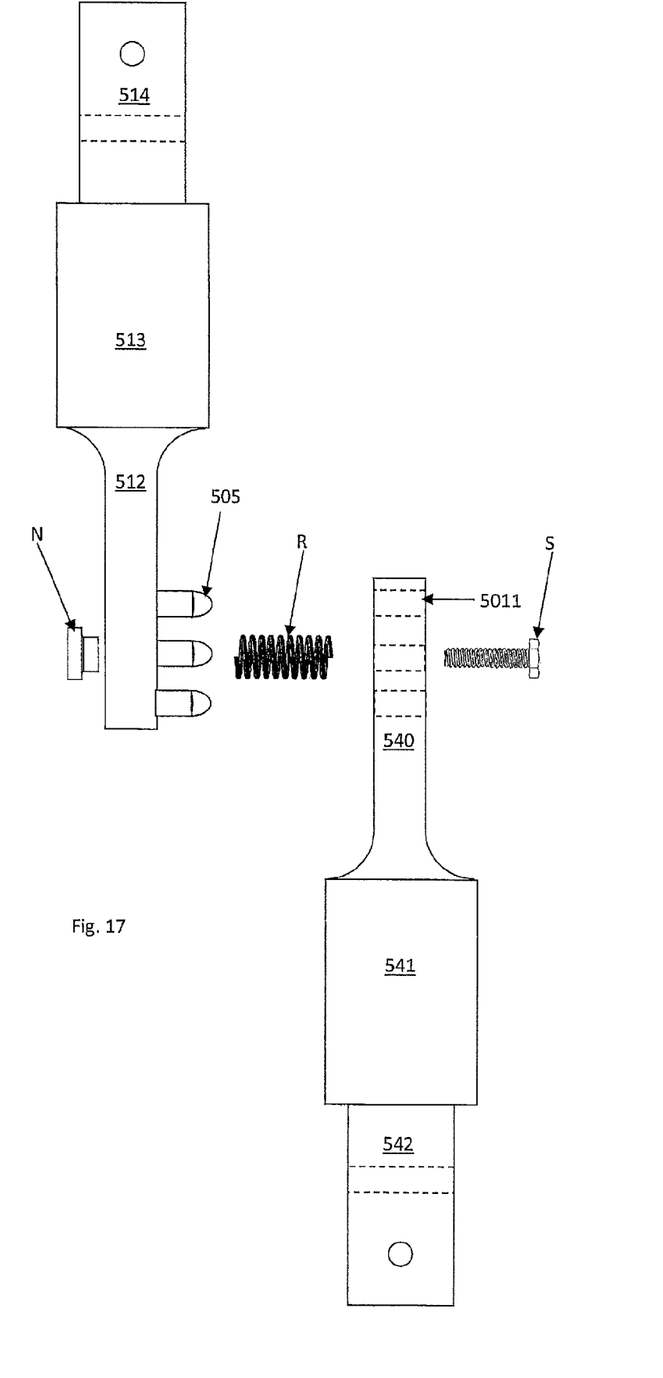
FIG. 17 shows a detailed view of the adjustable arm receiver and the elongated part assembling for the fourth exemplary embodiment in accordance with the principles of the present disclosure.

FIG. 17 shows a detailed view of the assembly for the adjustable arm receiver 501 and the elongated section 50, more particularly the adjustable arm supporter 502 in accordance with the principles of the present disclosure. The protrusions 500 are aligned and inserted inside receiving holes 5011. Depending on the position of the protrusion 500, in relation with the receiving holes 5011, an angle $\theta$ between the adjustable arm receiver 501 and the elongated section 50 is attained. The difference in angles between the adjustable arm receiver 501 and the elongated section 50 is directly proportional to the protrusion angular displacement $\beta$. In order to fix the adjustable arm receiver 501 and the elongated section 50 at a preferred angle, a screw S is inserted through the upper hole first diameter 53, wherein the head of said screw rest inside the upper receiving hole second diameter 531. The configuration of the upper receiving hole, more particularly the second receiving diameter 531, avoids unwanted rotation of the screw S. A spring R is located between the adjustable arm receiver 501 and the adjustable arm supporter 502, wherein said spring surrounds the screw S. The screw S extends and passes through the upper recess, more particularly the second diameter 520. Once it passes through the second diameter 520 a nut N is used to adjust the screw S in position. It is suggested to twist the nut N until enough pressure is exerted between the adjustable arm receiver 501 and the adjustable arm supporter 502.

Figure 18A:
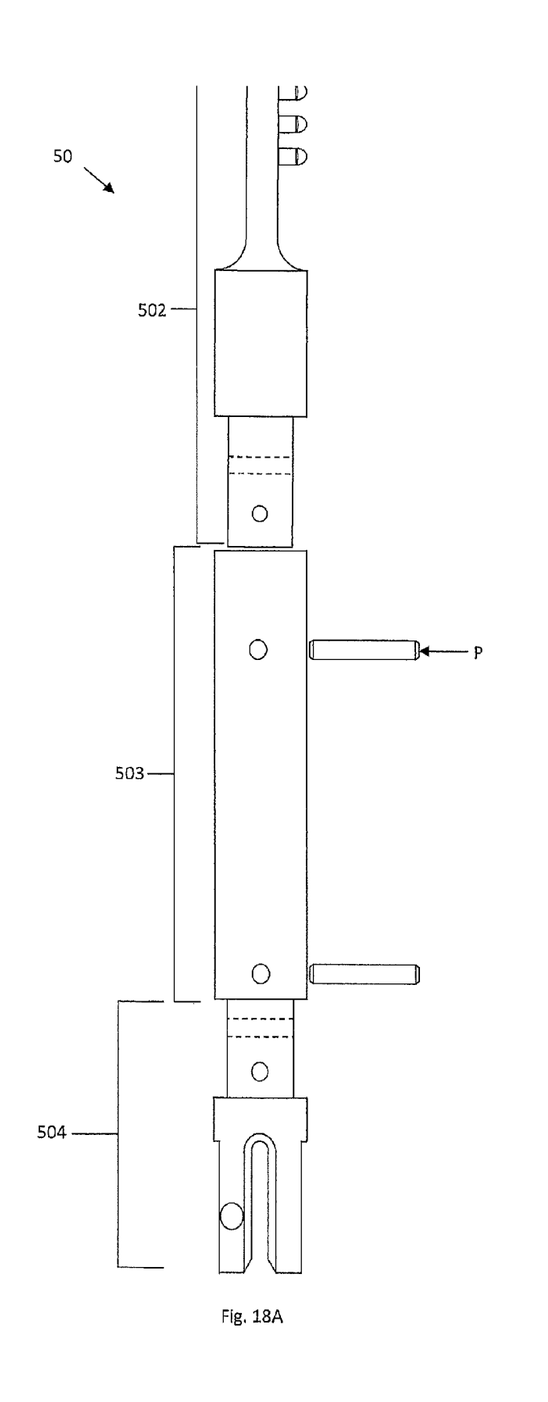
FIGS. 18A and 18B show detailed views of the elongated part assembling for the fourth exemplary embodiment in accordance with the principles of the present disclosure.
Figure 18B:
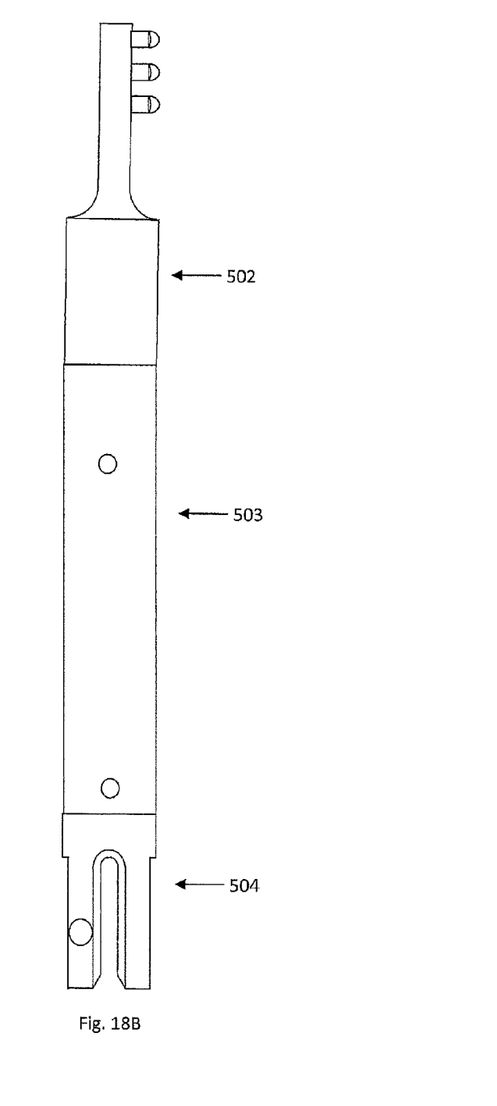

FIGS. 18A and 18B show a detailed view of the assembly of the elongated section 50 for the fourth exemplary embodiment in accordance with the principles of the present disclosure. As mentioned before, the adjustable arm supporter 502 lower body 514 is inserted at a first end of said adjustable arm extension 503, wherein the lower body 514 recesses 5141, 5142 are aligned with at least one of the pass-through holes 560, 561, at the second end of the adjustable arm extension 503. Further, the adjustable arm fixer 504 is inserted inside the adjustable arm extension 503 and the lower section 517 recesses 5171, 5172 are aligned with at least one of the pass-through holes 560, 561, at the first end of the adjustable arm extension 503.

The disclosure is not limited to the precise configuration described above. While the disclosure has been described as having a preferred design, it is understood that many changes, modifications, variations and other uses and applications of the present disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

We claim:

1. A supporting sporting equipment support apparatus comprising:
    at least a pair of tubular arms spaced apart from one another, said tubular arms comprising, an elongated part, a middle section comprising a middle elongated body, a first lateral support comprising a first distal end and a first proximal end; and a second lateral support comprising a second distal end and a second proximal end;
    wherein said middle elongated body is located between said first distal end and said second distal end is connected to said first distal end and said second distal end;
    wherein said elongated part extends away from said second lateral support, wherein said elongated part is connected to the first proximal end by an angle adjustable mechanism, and wherein said angle adjustable mechanism is between said elongated part and said first proximal end;
    wherein said angle adjustable mechanism comprises an adjustable arm receiver, wherein said adjustable receiver is attached to said first proximal end and vertically aligned with said first proximal end;
    wherein said elongated part comprises an adjustable arm supporter, wherein said adjustable arm receiver and said adjustable arm supporter are mechanically coupled; and wherein said adjustable arm receiver and said adjustable arm supporter are configured to readjust the angle between said elongated part and said first proximal end.

2. A sporting equipment support apparatus comprising as in claim 1, wherein said adjustable arm supporter comprises a plurality of protrusions;
    wherein said adjustable arm receiver comprises a plurality of receiving holes; and
    wherein said each protrusion of said plurality of protrusions is arranged to be inserted inside at least one of said plurality of receiving holes fixing an angle between said elongated part and said first proximal end.

3. A sporting equipment support apparatus comprising as in claim 1, wherein the tubular arm comprises an extension member.

4. A sporting equipment support apparatus as in claim 1, wherein the tubular arm comprises protrusions, and wherein said protrusion comprises protrusion's holes.

5. A sporting equipment support apparatus as in claim 1, wherein the elongated part comprises an adjustable arm extension and an adjustable arm fixer.

6. A sporting equipment support apparatus as in claim 1, wherein the middle section comprises a fist middle section mechanically coupled to the first distal end and a separated second middle section mechanically coupled to the second distal end.

7. A sporting equipment support apparatus as in claim 1, wherein the tubular arm comprises a cover.

* * * * *